(12) United States Patent
Kito et al.

(10) Patent No.: US 10,493,841 B2
(45) Date of Patent: Dec. 3, 2019

(54) FUEL SUPPLY DEVICE

(71) Applicant: TOYODA GOSEI CO., LTD., Kiyosu-shi, Aichi-ken (JP)

(72) Inventors: Hiroaki Kito, Kiyosu (JP); Yoshinari Hiramatsu, Kiyosu (JP); Sanae Noro, Gifu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 160 days.

(21) Appl. No.: 15/459,234

(22) Filed: Mar. 15, 2017

(65) Prior Publication Data
US 2017/0282707 A1    Oct. 5, 2017

(30) Foreign Application Priority Data

Apr. 1, 2016  (JP) ................................. 2016-074267

(51) Int. Cl.
*B60K 15/04* (2006.01)
*B67D 7/42* (2010.01)

(52) U.S. Cl.
CPC ............ *B60K 15/04* (2013.01); *B67D 7/42* (2013.01); *B60K 2015/048* (2013.01)

(58) Field of Classification Search
CPC ........... B60K 15/04; B60K 2015/0458; B60K 2015/048; B67D 7/42
See application file for complete search history.

(56) References Cited

U.S. PATENT DOCUMENTS

| | | | | |
|---|---|---|---|---|
| 5,435,358 A | * | 7/1995 | Kempka | B60K 15/04 141/312 |
| 5,725,033 A | * | 3/1998 | Steinkaemper | B60K 15/04 141/312 |
| 5,730,194 A | * | 3/1998 | Foltz | B60K 15/04 137/588 |
| 5,921,424 A | | 7/1999 | Palvolgyi | |
| 6,009,920 A | | 1/2000 | Palvoelgyi et al. | |

(Continued)

FOREIGN PATENT DOCUMENTS

| JP | 2012-116380 A | 6/2012 |
|---|---|---|
| JP | 2014-65445 A | 4/2014 |

(Continued)

OTHER PUBLICATIONS

Office Action dated Mar. 12, 2019 issued in corresponding JP patent application No. 2016-074267 (and English translation).

*Primary Examiner* — Nicolas A Arnett
(74) *Attorney, Agent, or Firm* — POSZ Law Group, PLC (57) ABSTRACT

There is provided a fuel supply device comprising a filler neck body provided in a tubular shape to include an opening which a fueling gun is inserted in and a connection port formed on a fuel tank-side end of the filler neck body and configured to form a fuel passage; and a neck integrated component located on an inner side of the filler neck body and configured to form an insertion passage. The neck integrated component is arranged to engage with inside of the filler neck body on a fuel tank side or with a fuel tank-side end of the filler neck body. This configuration suppresses a fueling gun from being stuck during insertion and reduces the possibility that the engagement part of the filler neck body and the neck integrated component is damaged.

15 Claims, 9 Drawing Sheets

(56) References Cited

U.S. PATENT DOCUMENTS

| | | | | |
|---|---|---|---|---|
| 6,079,581 | A * | 6/2000 | Hashimoto | B60K 15/04 |
| | | | | 123/516 |
| 6,546,972 | B1 * | 4/2003 | Foltz | B60K 15/04 |
| | | | | 141/301 |
| 8,490,661 | B1 * | 7/2013 | Leipold | B60K 15/04 |
| | | | | 141/312 |
| 8,726,950 | B2 * | 5/2014 | Miller | B60K 15/04 |
| | | | | 141/311 R |
| 9,415,679 | B2 * | 8/2016 | Frank | B60K 15/03006 |
| 9,694,675 | B2 * | 7/2017 | Sekihara | B60K 15/04 |
| 9,873,322 | B2 * | 1/2018 | Frank | B60K 15/04 |
| 2011/0132906 | A1 * | 6/2011 | Miller | B60K 15/04 |
| | | | | 220/86.2 |
| 2014/0284329 | A1 * | 9/2014 | Frank | B60K 15/03006 |
| | | | | 220/86.2 |
| 2015/0180258 | A1 | 6/2015 | Ujike et al. | |
| 2015/0183315 | A1 | 7/2015 | Kapaun | |
| 2016/0272478 | A1 * | 9/2016 | Sekihara | B60K 15/04 |
| 2017/0072790 | A1 * | 3/2017 | Frank | B60K 15/04 |

FOREIGN PATENT DOCUMENTS

| | | |
|---|---|---|
| JP | 2014-213700 A | 11/2014 |
| JP | 2015-118062 A | 6/2015 |
| JP | 2015-143043 A | 8/2015 |

* cited by examiner

FUEL SUPPLY DEVICE

CROSS-REFERENCE TO RELATED APPLICATION

The present application claims priority from Japanese patent application 2016-074267 filed on Apr. 1, 2016, the entirety of the content of which is hereby incorporated by reference into this application.

BACKGROUND

Technical Field

The disclosure relates to technology regarding a fuel supply device.

Related Art

A fuel supply device which a fueling gun used to supply a liquid fuel is inserted in has been known to introduce the liquid fuel to a fuel tank mounted on an automobile. For example, JP 2015-143043A describes a configuration that a retainer used to introduce an inserted fueling gun toward a fuel tank is placed inside of a filler pipe serving as a fuel supply device.

In the filler pipe described in JP 2015-143043A, the retainer is mounted to the vicinity of a filler port configured to receive the fueling gun inserted therein. The fueling gun is likely to be stuck in the course of insertion or is likely to come into contact with the retainer in the course of insertion. As a result, the mounting part of the retainer to the filler pipe may be damaged or the retainer may come off from the filler pipe.

SUMMARY

In order to solve at least part of the problems described above, the disclosure may be implemented by aspects or configurations described below.

(1) According to one aspect of the disclosure, there is provided a fuel supply device configured to supply a liquid fuel to a fuel tank. This fuel supply device comprises a filler neck body provided in a tubular shape to include an opening which a fueling gun used to supply the liquid fuel is inserted in and a connection port formed on a fuel tank-side end of the filler neck body and configured to form a fuel passage that introduces the supplied liquid fuel from the opening to the connection port; and a neck integrated component located on an inner side in a radial direction of the filler neck body, the neck integrated component being configured to form an insertion passage which the fueling gun is inserted in. The neck integrated component is arranged to engage with inside of the filler neck body on a fuel tank side or with a fuel tank-side end of the filler neck body. In the fuel supply device of this aspect, the filler neck body and the neck integrated component are engaged with each other not on the opening side but on the fuel tank side that is the more downstream side. Accordingly the engagement part is less likely to receive a load by the contact of the fueling gun in the vicinity of the opening when the fueling gun is inserted into the opening. This configuration reduces the possibility that the neck integrated component comes off from the filler neck body and the possibility that the engagement part of the filler neck body and the neck integrated component is damaged.

(2) In the fuel supply device of the above aspect, a fuel tank-side end of the neck integrated component may be located on the fuel tank side of a fueling gun end that is a fuel tank-side end of the inserted fueling gun. The neck integrated component may be engaged with the inside of the filler neck body or with the fuel tank-side end of the filler neck body on the fuel tank side of the fueling gun end. In the fuel supply device of this aspect, the inserted fueling gun does not come into contact with the engagement part of the filler neck body and the neck integrated component. The neck integrated component thus does not direction receive the force produced by the inserted fueling gun. This configuration reduces the possibility that the neck integrated component comes off from the filler neck body and the possibility that the engagement part of the filler neck body and the neck integrated component is damaged.

(3) In the fuel supply device of the above aspect, the filler neck body may include a first groove provided on the fuel tank side of the fueling gun end and configured to increase a diameter of the fuel passage. The neck integrated component may include a first pawl configured to change an amount of protrusion in the radial direction. The first pawl may be engaged with the first groove, such that the neck integrated component is engaged with the inside of the filler neck body or with the fuel tank-side end of the filler neck body. In the fuel supply device of this aspect, the neck integrated component is fixed to the filler neck body by a force in a different direction from the direction of a force applied in the course of insertion of the fueling gun. This configuration reduces the possibility that the neck integrated component comes off from the filler neck body and the possibility that the engagement part of the filler neck body and the neck integrated component is damaged in the course of insertion of the fueling gun into the fuel supply device.

(4) In the fuel supply device of the above aspect, the filler neck body may include an annular projection provided on an outer circumference on the fuel tank side and configured to engage with inside of a tube that is arranged to connect the fuel supply device with the fuel tank. In the fuel supply device of this aspect, when the tube is connected with the annular projection, the filler neck body receives a force applied inward in the radial direction from the tube. This force is applied in an opposite direction to the direction of the force expanding the first pawl. This configuration thus enables the neck integrated component to be more securely fixed to the filler neck body.

(5) In the fuel supply device of the above aspect, the filler neck body may include a first stepped portion provided on an opening side of the fueling gun end and configured to reduce the diameter of the fuel passage. The neck integrated component may include a second stepped portion formed along the first stepped portion. In the fuel supply device of this aspect, the inserted fuel gun is likely to come into contact with the second stepped portion of the neck integrated component. Accordingly the force produced by the inserted fueling gun is less likely to be applied to an engagement part of the first groove and the first pawl. This configuration reduces the possibility that the neck integrated component comes off from the filler neck body and the possibility that the engagement part of the filler neck body and the neck integrated component is damaged in the course of insertion of the fueling gun into the fuel supply device.

(6) In the fuel supply device of the above aspect, the filler neck body may include a second pawl configured to change an amount of protrusion in the radial direction. The neck integrated component may include a projection protruded outward in the radial direction. The second pawl may be engaged with a second groove that is formed by the projection and an outer circumferential face of the neck integrated component, such that the neck integrated component is engaged with the inside of the filler neck body or with the fuel tank-side end of the filler neck body. In the fuel supply device of this aspect, the neck integrated component is fixed to the filler neck body by a force in a different direction from the direction of a force applied in the course of insertion of the fueling gun. This configuration reduces the possibility that the neck integrated component comes off from the filler neck body and the possibility that the engagement part of the filler neck body and the neck integrated component is damaged in the course of insertion of the fueling gun into the fuel supply device.

(7) In the fuel supply device of the above aspect, the neck integrated component may include a first neck component configured to engage with the inside of the filler neck body and a second neck component arranged on the fuel tank side of the first neck component and configured such that a position of the second neck component along a flow direction of the liquid fuel is restricted by a fuel tank-side end of the first neck component. A fuel tank-side end of the second neck component may be located on the fuel tank side of the fueling gun end. In the fuel supply device of this aspect, the inserted fueling gun does not come into contact with an inner circumferential side of the engagement part of the neck integrated component with the filler neck body. The position of the second neck component is restricted by the first neck component. This configuration reduces the possibility that the neck integrated component comes off from the filler neck body and the possibility that the engagement part of the filler neck body and the neck integrated component is damaged in the course of insertion of the fueling gun into the fuel supply device.

The present disclosure may be implemented by any of various aspects other than the fuel supply device described above, for example, an automobile equipped with the fuel supply device or a manufacturing method of the fuel supply device.

The configuration of any of the above aspects reduces the possibility that the neck integrated component comes off from the filler neck body and the possibility that the engagement part of the filler neck body and the neck integrated component is damaged.

DESCRIPTION OF EMBODIMENTS

A. First Embodiment (1) General Configuration of Fuel Supply Device FS

Figure 1:
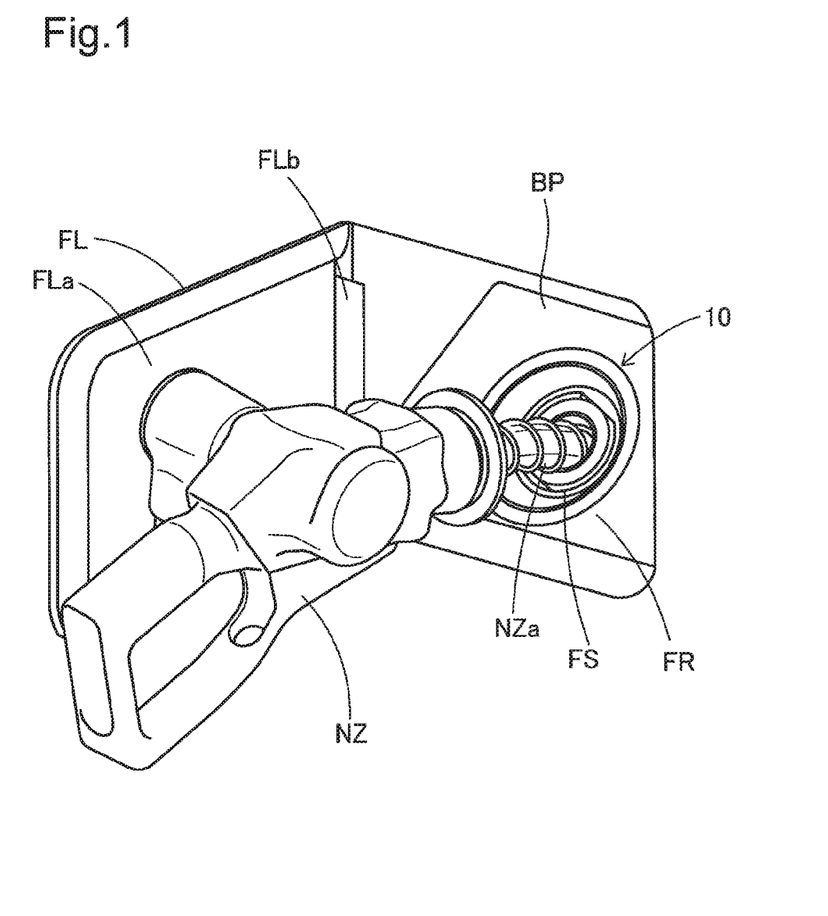
FIG. 1 is a perspective view illustrating insertion of a fueling gun used to supply a fuel, in a fuel supply device.

FIG. 1 is a perspective view illustrating insertion of a fueling gun NZ used to supply a fuel, in a fuel supply device FS. FIG. 1 illustrates the fuel supply device FS having a fuel passage that is arranged to introduce the supplied fuel to a fuel tank (not shown) provided inside of an automobile, the fueling gun NZ inserted into the fuel supply device FS, and members placed in the periphery of the fuel supply device FS. A fuel lid FL is supported on the vehicle body of the automobile to be openable and closable. The fuel lid FL includes a lid main body FLa formed in a shape following the shape of an outer plate of the vehicle body. The lid main body FLa is supported on the outer plate of the vehicle body via a hinge FLb to be openable and closable. A space defined by opening the fuel lid FL forms a fueling chamber FR. An open-close device 10 for the fuel tank supported on a base plate BP is placed in the fueling chamber FR. The open-close device 10 for the fuel tank is a mechanism configured to introduce the fuel to the fuel tank via the fuel supply device FS without using a fuel cap.

(2) Relationship of Filler Neck Body to Nozzle Guide in Fuel Supply Device

Figure 2:
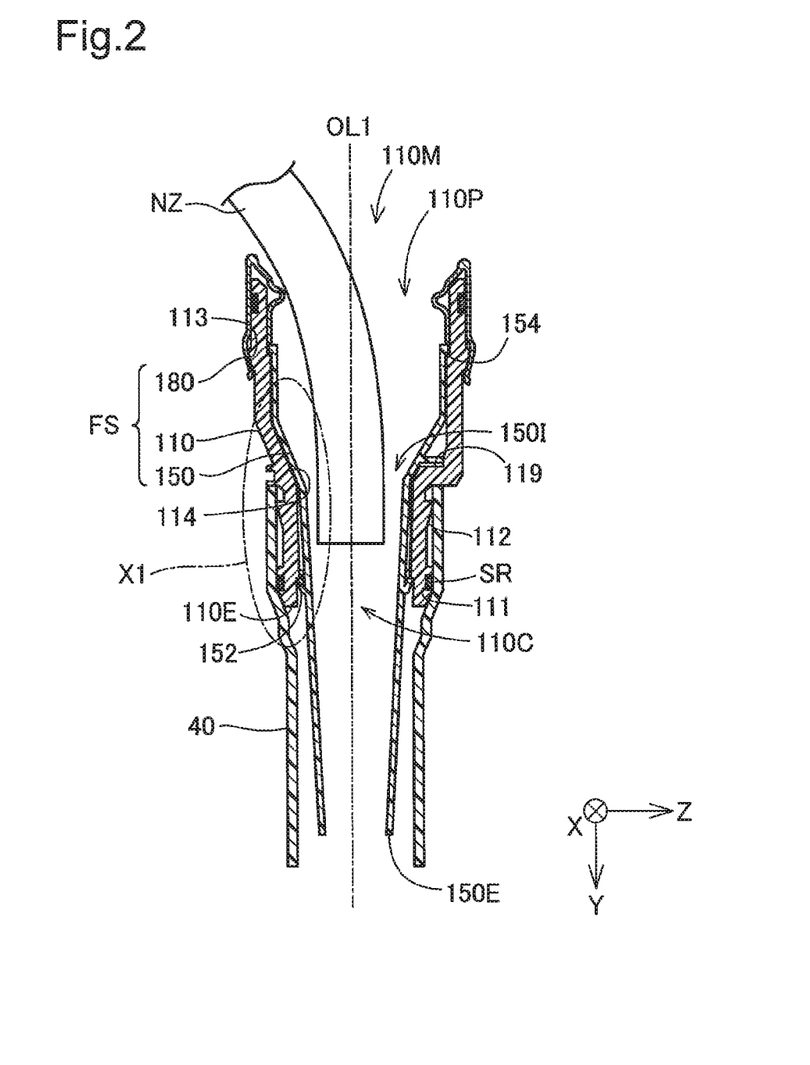
FIG. 2 is a sectional view illustrating the fuel supply device with the fueling gun inserted therein and a filler tube connected with the fuel supply device.

FIG. 2 is a sectional view illustrating the fuel supply device FS with the fueling gun NZ inserted therein and a filler tube 40 connected with the fuel supply device FS. As illustrated in FIG. 2, the fuel supply device FS is connected with the filler tube 40 that is located on a fuel tank side that is opposite to the side where the fueling gun NZ is inserted and is configured to introduce the liquid fuel to the fuel tank.

The fuel supply device FS may include a filler neck body 110 made of a resin such as polyamide or polyethylene, a retainer 180 configured to cover an upstream side of the filler neck body 110, a nozzle guide 150 placed inside of the filler neck body 110, and a seal ring SR made of a rubber such as NBR. The filler neck body 110 forms an opening 110M in which the fueling gun NZ is inserted. The filler neck body 110 is formed in a cylindrical shape to form a hollow fuel passage 110P along an axis OL1 from the opening 110M toward the fuel tank. The fuel passage 110P is configured to decrease the flow diameter toward the fuel tank. According to this embodiment, the filler neck body 110 includes an inclined surface 114 that is inclined toward the fuel tank, and a first stepped portion 119 that has the diameter reduced in a radial direction along a plane perpendicular to the axis OL1. The filler neck body 110 has an open connection port 110C that is provided on its fuel tank-side end that is opposite to an end with the opening 110M. An annular projection 112 is formed on an outer circumferential face of the filler neck body 110 that forms the connection port 110C, to be protruded approximately perpendicularly toward the outer circumferential side and to be inclined and reduce the diameter toward the fuel tank. The seal ring SR formed about the axis OL1 as the center is placed in a concave 111 that is formed by the annular projection 112 and is recessed toward the inner circumferential side. Press-fitting the filler tube 40 on the outer circumferential side of the annular projection 112 fixes the filler neck body 110 to the filler tube 40. The filler tube 40 corresponds to the tube in the claims.

The nozzle guide 150 is formed in a cylindrical shape and is placed on the inner circumferential side of the filler neck body 110 to be along an inner circumferential face of the filler neck body 110. The nozzle guide 140 is made of a resin material. An insertion passage 150I is formed on the inner circumferential side of the nozzle guide 150 and is configured to introduce the fueling gun NZ toward the fuel tank. As illustrated in FIG. 2, according to this embodiment, part of the fuel passage 110P formed by the filler neck body 110 is overlapped with part of the insertion passage 150I formed by the nozzle guide 150.

Figure 3:
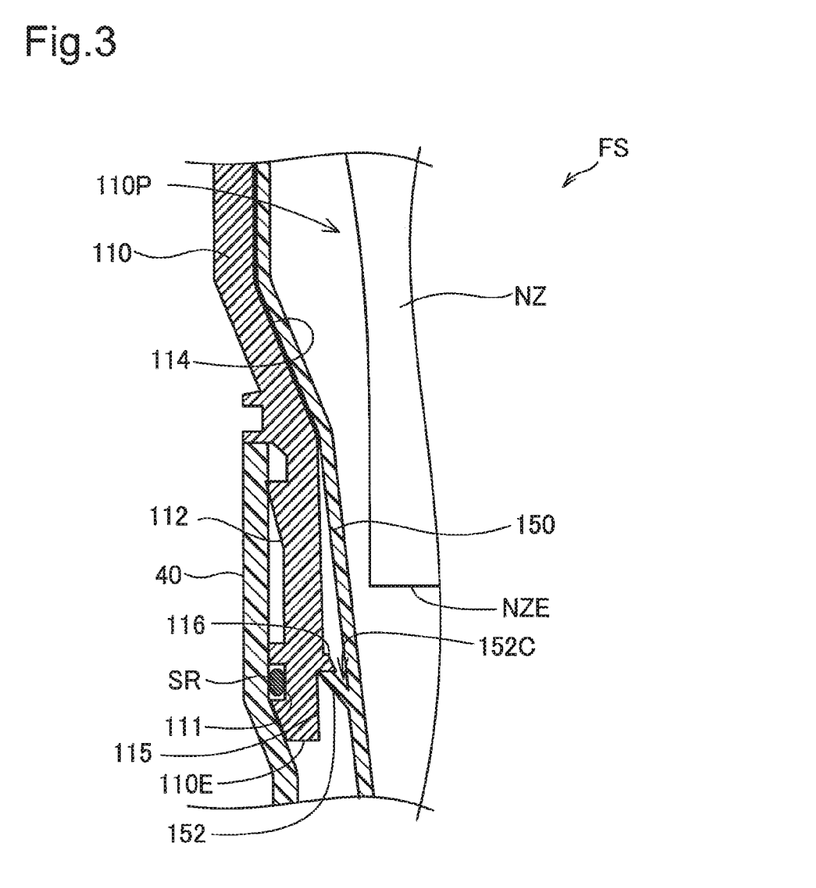
FIG. 3 is an enlarged view illustrating an area X1 shown in FIG. 2.

A fuel tank-side end 150E of the nozzle guide 150 is located on the fuel tank side of a fuel tank-side end 110E of the filler neck body 110. The nozzle guide 150 includes first pawls 152 provided in the periphery of the inner circumferential side of the end 110E of the filler neck body 110 to engage with the filler neck body 110. In short, the nozzle guide 150 is engaged with the filler neck body 110 on the fuel tank side of the filler neck body 110. The first pawl 152 is not formed along the entire outer circumference of the nozzle guide 150 but is formed at two symmetrical positions about the axis OL1 as the center. The details of the first pawls 152 will be described later with reference to an enlarged view of FIG. 3 illustrating an area X1 (shown in FIG. 2). According to this embodiment, the first pawls 152 of the nozzle guide 150 are formed to be located on the fuel tank side of a fuel tank-side fueling gun end NZE of the fueling gun NZ inserted into the opening 110M of the filler neck body 110.

The nozzle guide 150 includes a positioning element 154 formed to have a different diameter. The position of the nozzle guide 150 along the axis OL1 is fixed to the filler neck body 110 by the positioning element 154 and the stepped portion formed in the filler neck body 110. The nozzle guide 150 corresponds to the neck integrated component in the claims.

The retainer 180 is a circular member formed about the axis OL1 as the center and configured to cover an opening 110M-side end of the filler neck body 110. The retainer 180 is made of a metal. A fuel tank-side end of the retainer 180 provided along the inner circumferential face of the filler neck body 110 is arranged adjacent to the opening 110M-side end of the nozzle guide 150. Accordingly the position of the retainer 180 along the axis OL1 is determined by the opening 110M-side end of the nozzle guide 150. The retainer 180 provided along the outer circumferential face of the filler neck body 110 is engaged with an outer circumference inclined portion 113 formed on an outer circumferential face of the filler neck body 110. In the description below, the opening 110M-side is also called upstream side, and the fuel tank side is also called downstream side.

Figure 4:
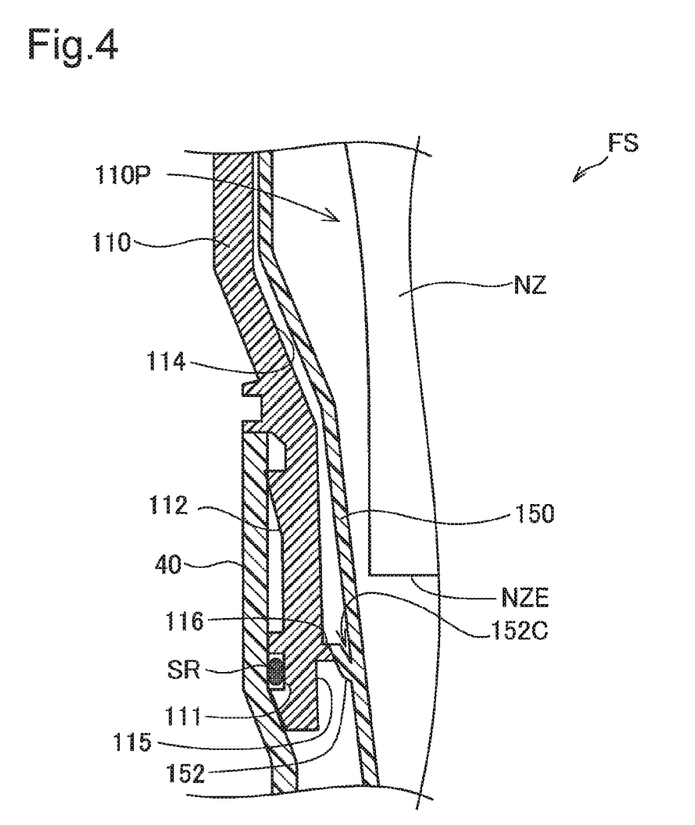
FIG. 4 is an enlarged view corresponding to the area X1 of FIG. 2 in the middle of fixation of a nozzle guide inside of a filler neck body.

FIG. 3 is an enlarged view illustrating an area X1 shown in FIG. 2, FIG. 4 is an enlarged view corresponding to the area X1 of FIG. 2 in the middle of fixation of the nozzle guide 150 inside of the filler neck body 110. As illustrated in FIG. 3, the filler neck body 110 includes protruded portions 116 and first grooves 115 on the inner circumferential side of the end 110E. The protruded portion 116 is protruded from the remaining portion toward the center in the radial direction. The first groove 115 is located on the fuel tank side of the protruded portion 116 and is configured to increase the diameter of the fuel passage 110P compared with the remaining portion.

The protruded portion 116 is formed to have an inner circumferential face as an inclined surface having the amount of protrusion in the radial direction that is gradually increased toward the downstream side. The protruded portion 116 and the first groove 115 are not formed along the entire circumference on the inner circumferential side of the filler neck body 110 but are formed at two positions corresponding to the two first pawls 152 shown in FIG. 2.

As shown by a change from FIG. 4 to FIG. 3, when the nozzle guide 150 is inserted from the upstream side of the filler neck body 110 to the downstream side, the first pawls 152 first come into contact with the protruded portions 116 to reduce the diameter in the radial direction and are subsequently placed on the downstream side of the protruded portions 116 to be protruded and increase the diameter in the radial direction. The first pawl 152 has a cut 152C (shown in FIG. 3) on the upstream side and is thus allowed to be expanded and contracted in the radial direction of the fuel passage 110P (insertion passage 150I). In other words, the amount of protrusion of the first pawl 152 in the radial direction may be increased or decreased along with a change of the cut 152C in the radial direction, so that the first pawls 152 are engaged with the first grooves 115 of the filler neck body 110.

(3) Advantageous Effects of Engagement Between Grooves of Filler Neck and Pawls of Nozzle Guide In the process of insertion of the fueling gun NZ into the fuel supply device FS, when the fueling gun NZ comes into contact with the nozzle guide 150, a force is likely to be applied to the nozzle guide 150 in a direction along the axis OL1 from the opening 110M of the filler neck body 110 toward the fuel tank. In the fuel supply device FS of this embodiment, the first grooves 115 and the first pawls 152 provided to fix the nozzle guide 150 to the filler neck body 110 are located on the downstream side of the fueling gun end NZE of the inserted fueling gun NZ. In the fuel supply device FS of this embodiment, this configuration prevents the fueling gun NZ from coming into contact with the inner circumferential side of the nozzle guide 150 where the first pawls 152 are formed. The first pawls 152 accordingly do not directly receive a force produced by the inserted fueling gun NZ, This configuration thereby reduces the possibility that the nozzle guide 150 comes off from the filler neck body 110 and the possibility that the engagement part of the filler neck body 110 and the nozzle guide 150 is damaged.

In the fuel supply device FS of this embodiment, the first pawls 152 of the nozzle guide 150 are expanded in the circumferential direction to be engaged with the first grooves 115 formed on the inner circumferential side of the filler neck body 110. This engagement fixes the nozzle guide 150 to the filer neck body 110. In other words, the nozzle guide 150 is fixed to the filler neck body 110 by the force in a different direction from the direction along the axis OL1 applied in the process of insertion of the fueling gun NZ into the field supply device FS. The configuration of the fuel supply device FS of this embodiment reduces the possibility that the nozzle guide 150 comes off from the filler neck body 110 and the possibility that the engagement part of the filler neck body 110 and the nozzle guide 150 is damaged by the force produced in the process of insertion of the fueling gun. NZ.

In the fuel supply device FS of this embodiment, the filler neck body 110 includes the annular projection 112 provided on the outer circumference on the downstream side to receive the filler tube 40 press-fit thereon. When the filler tube 40 is press-fit on the annular projection 112, the filler neck body 110 receives the force along the axis OL1 in the radial direction from the filler tube 40. This force is applied in the opposite direction to the direction of the force expanding the first pawls 152 in the radial direction about the axis OL as the center. This configuration thus more securely fixes the nozzle guide 150 to the filler neck body 110.

B. Second Embodiment

Figure 5:
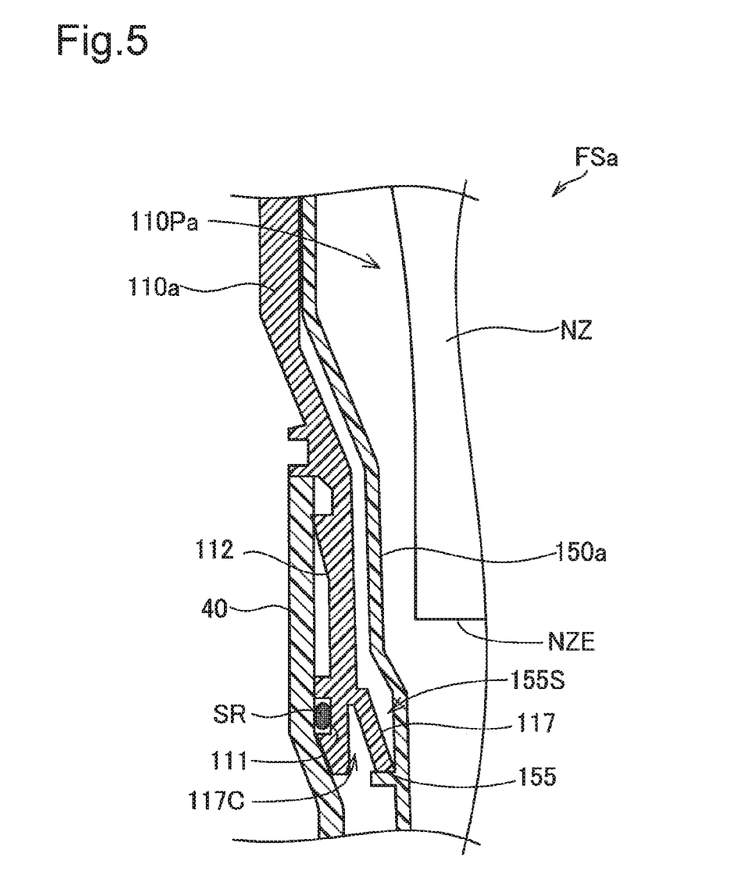
FIG. 5 is an enlarged view corresponding to the area X1 of FIG. 2 of the first embodiment in the middle of fixation of a nozzle guide inside of a filler neck body according to a second embodiment.

FIG. 5 is an enlarged view corresponding to the area X1 of FIG. 2 of the first embodiment in the middle of fixation of a nozzle guide 150a inside of a filler neck body 110a according to a second embodiment. A fuel supply device FSa of the second embodiment differs from the fuel supply device FS of the first embodiment by the shape of the filler neck body 110a and the shape of the nozzle guide 150a that are engaged on the downstream side of the fueling gun end NZE of the inserted fueling gun NZ. Otherwise the configuration of the fuel supply device FSa of the second embodiment is similar to the configuration of the fuel supply device FS of the first embodiment. The following describes only the different parts of the second embodiment from the fuel supply device FS of the first embodiment, and the description on the similar parts to those of the fuel supply device FS is omitted.

As illustrated in FIG. 5, in the fuel supply device FSa of the second embodiment, second pawls 117 are formed on the filler neck body 110a, in place of the first pawls 152 formed on the nozzle guide 150 of the first embodiment, and projections 155 are formed on the nozzle guide 150a, in place of the protruded portions 116 formed on the filler neck body 110 of the first embodiment. Along with formation of the projections 155, second grooves 155S are formed on an outer circumferential face of the nozzle guide 150a of the second embodiment, in place of the first grooves 115 of the first embodiment. The second pawl 117 is protruded from the upstream side toward the downstream side and is branched off from the filler neck body 110a toward the inner circumferential side by a cut 117C. The second pawl 117 is thus allowed to be expanded and contracted in the radial direction about the axis OL1 as the center. The projection 155 is protruded outward in the radial direction on the outer circumferential side of the nozzle guide 150a. The projection 155 of the nozzle guide 150a and the outer circumferential face of the nozzle guide 150a on the upstream side of the protrusion 155 form the second groove 155S which the second pawl 117 is engaged with.

In the fuel supply device FSa of the second embodiment, the cut 117C is contracted such as to cause the second pawl 117 of the filler neck body 110a to be expanded outward in the radial direction and to be engaged with the second groove 155S, so that the nozzle guide 150a is fixed to the filler neck body 110a. The configuration of the fuel supply device FSa of the second embodiment reduces the possibility that the nozzle guide 150a comes off from the filler neck body 110a and the possibility that the engagement part of the filler neck body 110a and the nozzle guide 150a is damaged by the force produced in the process of insertion of the fueling gun NZ.

C. Third Embodiment

Figure 6:
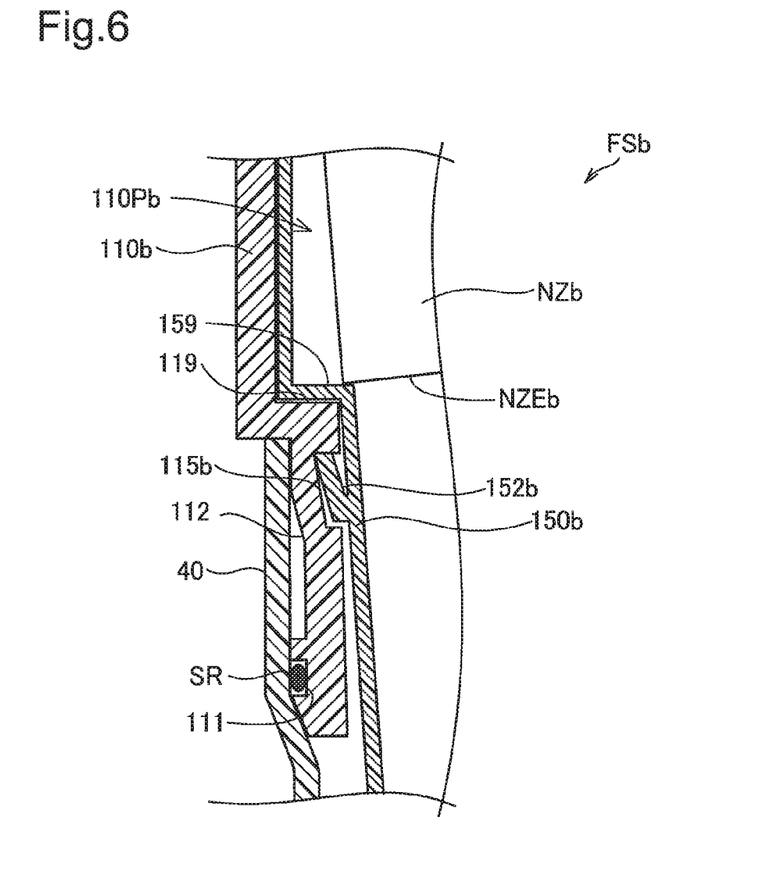
FIG. 6 is an enlarged view corresponding to the area X1 of FIG. 2 of the first embodiment when a nozzle guide is fixed inside of a filler neck body according to a third embodiment.

FIG. 6 is an enlarged view corresponding to the area X1 of FIG. 2 of the first embodiment when a nozzle guide 150b is fixed inside of a filler neck body 110b according to a third embodiment. A fuel supply device FSb of the third embodiment differs from the fuel supply device FS of the first embodiment by the shapes of a fuel passage 110Pb and an insertion passage 150I, the position of insertion of a fueling gun NZb, and the position of engagement part of the filler neck body 110b and the nozzle guide 150b. Otherwise the configuration of the fuel supply device FSb of the third embodiment is similar to the configuration of the fuel supply device FS of the first embodiment. The following describes only the different parts of the third embodiment from the fuel supply device FS of the first embodiment, and the description on the similar parts to those of the fuel supply device FS is omitted.

As illustrated in FIG. 6, in the fuel supply device FSb of the third embodiment, the position of the engagement part of the filler neck body 110b and the nozzle guide 150b is located on the upstream side, compared with the configuration of the first embodiment. The filler neck body 110b includes first grooves 115b without projections. First pawls 152b of the nozzle guide 150b formed in the same shape as that of the first embodiment are engaged with the first grooves 115b. The filler neck body 110b includes a first stepped portion 119b that is provided at the position where the inclined surface 114 is formed in the filler neck body 110 of the first embodiment. In other words, the filler neck body 110b includes the first stepped portion 119b arranged perpendicular to the axis MA along its entire inner circumferential face. The nozzle guide 150b includes a second stepped portion 159 that is formed along the first stepped portion 119b, The flow diameter of the fuel passage 110Pb formed by the second stepped portion 159 is smaller than the diameter of a fueling gun end NZEb. This configuration causes the fueling gun NZb inserted into the fuel supply device Fsb to come into contact with the second stepped portion 159 and thereby controls the position of insertion of the fueling gun NZb toward the downstream side. The fueling gun end. NZEb of the fueling gun NZb is accordingly located on the upstream side of the fueling gun end NZE of the first embodiment. The engagement part of the first grooves 115b and the first pawls 152b is thus located on the downstream side of the fueling gun end NZEb.

As described above, in the fuel supply device FSb of the third embodiment, the nozzle guide 150b includes the second stepped portion 159 arranged parallel to the radial direction along the first stepped portion 119 of the filler neck body 110b. The position of insertion of the fueling gun NZb toward the downstream side is controlled by the second stepped portion 159. A force produced by the inserted fueling gun NZb is thus less likely to be applied to the inner circumferential side of the first pawls 152b that are engaged with the first grooves 115b. The configuration of the fuel supply device FSb of the third embodiment further reduces the possibility that the nozzle guide 150b comes off from the filler neck body 110b and the possibility that the engagement part of the filler neck body 110b and the nozzle guide 150b is damaged by the force produced in the process of insertion of the fueling gun NZb.

Figure 7:
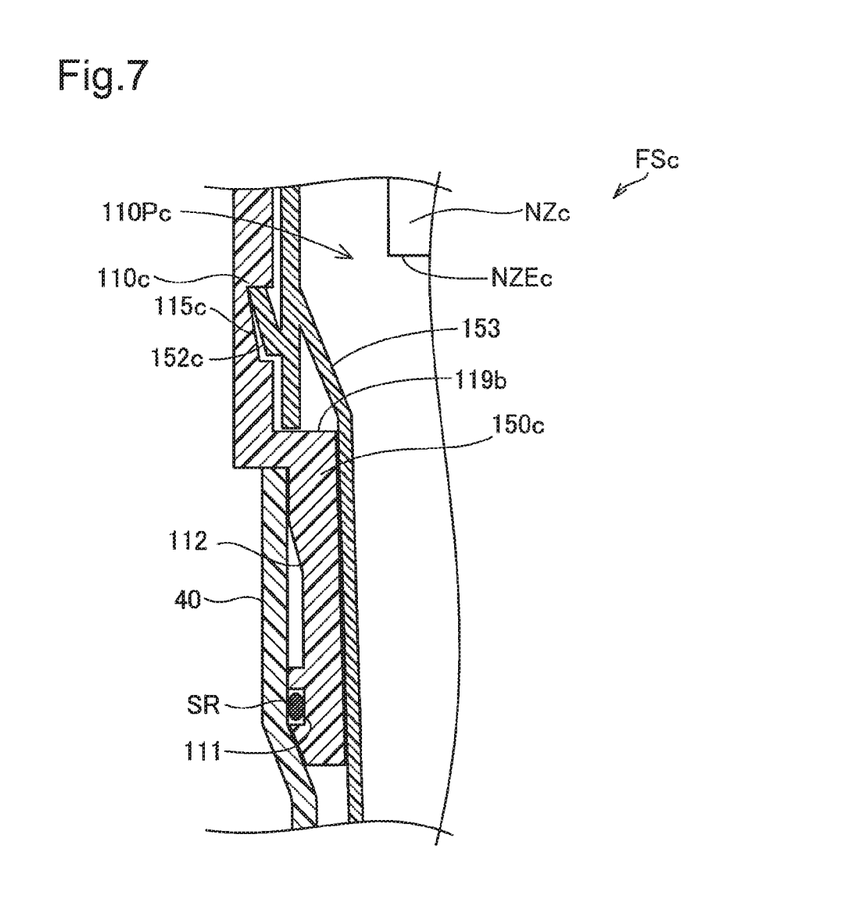
FIG. 7 is an enlarged view corresponding to FIG. 6 when a nozzle guide is fixed inside of a filler neck body in a fuel supply device according to a modification of the third embodiment.

FIG. 7 is an enlarged view corresponding to FIG. 6 when a nozzle guide 150c is fixed inside of a filler neck body 110c in a fuel supply device FSc according to a modification of the third embodiment. The fuel supply device FSc of the modification of the third embodiment differs from the fuel supply device FSb of the third embodiment by the position of a first groove 115c and a first pawl 152c, the position of a fueling gun end NZEc of a fueling gun NZc, inserted into the fuel supply device FSc, and the presence of an inclined surface 153 provided on an inner circumferential face of the nozzle guide 150c. Otherwise the configuration of the fuel supply device FSc of the modification of the third embodiment is similar to the configuration of the fuel supply device FSb of the third embodiment. The following describes only the different parts of the modification of the third embodiment from the fuel supply device FSb of the third embodiment, and the description on the similar parts to those of the fuel supply device FSb is omitted.

As illustrated in FIG. 7, the first groove 115c is formed on the upstream side of a first stepped portion 119b in the filler neck body 110c. Similarly the first pawl 152c is formed to be arranged on the upstream side of the first stepped portion 119b in the nozzle guide 150c. The first groove 115c and the first pawl 152c are located on the downstream side of the fueling gun end NZEc of the fueling gun NZe inserted in the fuel supply device FSc. Unlike the fuel supply device FSb of the third embodiment, the nozzle guide 150c excludes the second stepped portion 159 formed along the first stepped portion 119b. Instead of the second stepped portion 159, the nozzle guide 150c includes an inclined surface 153 configured to gradually decrease the flow diameter of a fuel passage 110Pc toward the downstream side. Like the fuel supply device FSb of the third embodiment, the configuration of the fuel supply device FSc according to the modification of the third embodiment further reduces the possibility that the nozzle guide 150c comes off from the filler neck body 110c and the possibility that the engagement part of the filler neck body 110c and the nozzle guide 150c is damaged by the force produced in the process of insertion of the fueling gun NZc.

D. Fourth Embodiment

Figure 8:
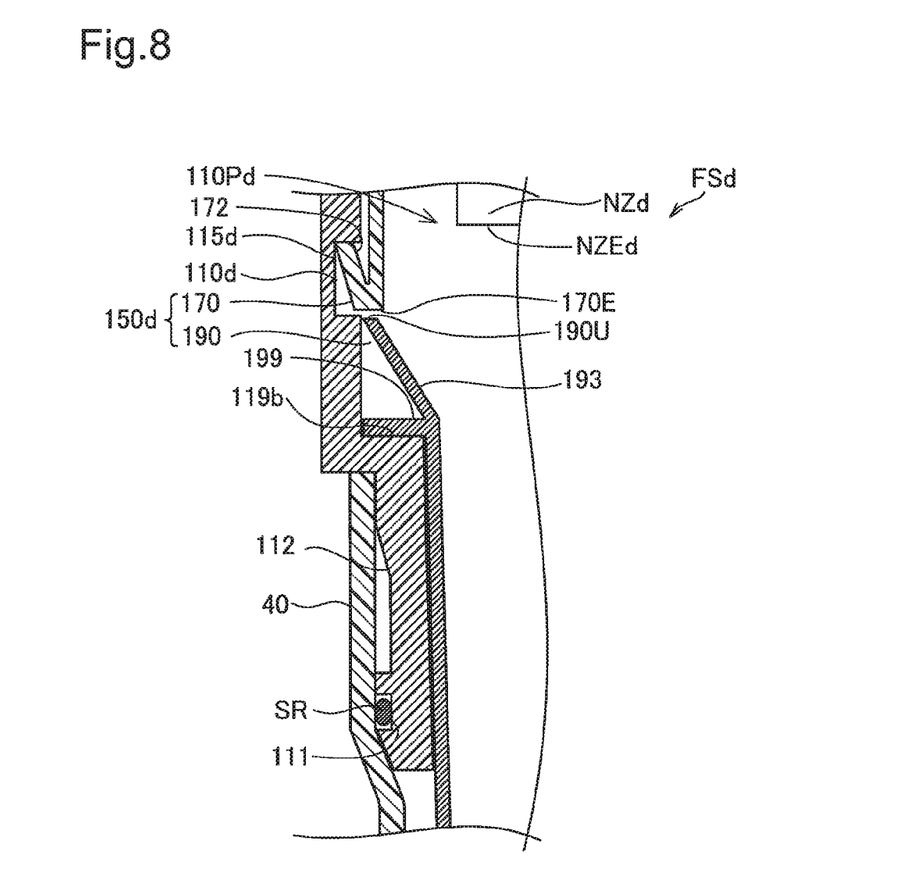
FIG. 8 is an enlarged view corresponding to the area X1 of FIG. 2 of the first embodiment when a nozzle guide is fixed inside of a filler neck body according to a fourth embodiment.

FIG. 8 is an enlarged view corresponding to the area X1 of FIG. 2 of the first embodiment when a nozzle guide 150d is fixed inside of a filler neck body 110d according to a fourth embodiment. A fuel supply device FSd of the fourth embodiment differs from the fuel supply device FSc of the modification of the third embodiment by the presence of a first guide portion 170 and a second guide portion 190 in the nozzle guide 150d and the position of a fueling gun end NZEd of a fueling gun NZd. Otherwise the configuration of the fuel supply device FSd of the fourth embodiment is similar to the configuration of the fuel supply device FSc of the modification of the third embodiment. The following describes only the different parts of the fourth embodiment from the fuel supply device FSc of the modification of the third embodiment, and the description on the similar parts to those of the fuel supply device FSc is omitted.

As illustrated in FIG. 8, the nozzle guide 150d of the fuel supply device FSd includes a first guide portion 170 and a second guide portion 190. The first guide portion 170 includes a first pawl 172 provided on its downstream-side end 170E and configured to engage with a first groove 115d provided in the filler neck body 110d. The first pawl 172 is located on the downstream side of the fueling gun end NZEd of the fueling gun NZd inserted in the fuel supply device FSd. The second guide portion 190 is configured to introduce the liquid fuel supplied from the fueling gun end NZEd toward the downstream side. The second guide portion 190 includes a second stepped portion 199 formed along a first stepped portion 119b of the filler neck body 110d, and an inclined surface 193. The inclined surface 193 is configured to gradually decrease the flow diameter of a fuel passage 110Pd toward the downstream side. A downstream-side end of the second guide portion 190 is located on the downstream side of a downstream-side end of the filler neck body 110d, although not being specifically illustrated in FIG. 8. An upstream-side end 190U of the second guide portion 190 is arranged to be opposed to the downstream-side end 170E of the first guide portion 170. There is little clearance between the end 190U and the end 170E, so that the position of the second guide portion 190 along the direction from the upstream side to the downstream side is restricted by the first guide portion 170 and the first stepped portion 119b. According to another embodiment, the second guide portion 190 may be in contact with and adjacent to the first guide portion 170. The first guide portion 170 corresponds to the first neck part in the claims, and the second guide portion 190 corresponds to the second neck part in the claims.

As described above, in the fuel supply device FSd of the fourth embodiment, the nozzle guide 150d includes the first guide portion 170 and the second guide portion 190. The first guide portion 170 includes the first pawl 172 configured to engage with the first groove 115d of the filler neck body 110d. The engagement part of the first groove 115d and the first claw 172 is located on the downstream side of the fueling gun end NZEd of the fueling gun NZd inserted in the fuel supply device FSd. The position of the second guide portion 190 along the direction from the upstream side to the downstream side is restricted by the downstream-side end 170E of the first guide portion 170. The downstream-side end of the second guide portion 190 is located on the downstream side of the downstream-side end of the filler neck body 110d. Accordingly, in the fuel supply device FSd of the fourth embodiment, the inserted fueling gun NZd does not come into contact with the inner circumferential side of the first pawl 172 in the engagement part. The position of the second guide portion 190 is restricted by the first guide portion 170. This configuration reduces the possibility that the nozzle guide 150d comes off from the filler neck body 110d and the possibility that the engagement part of the filler neck body 110d and the nozzle guide 150d is damaged.

E. Fifth Embodiment

Figure 9:
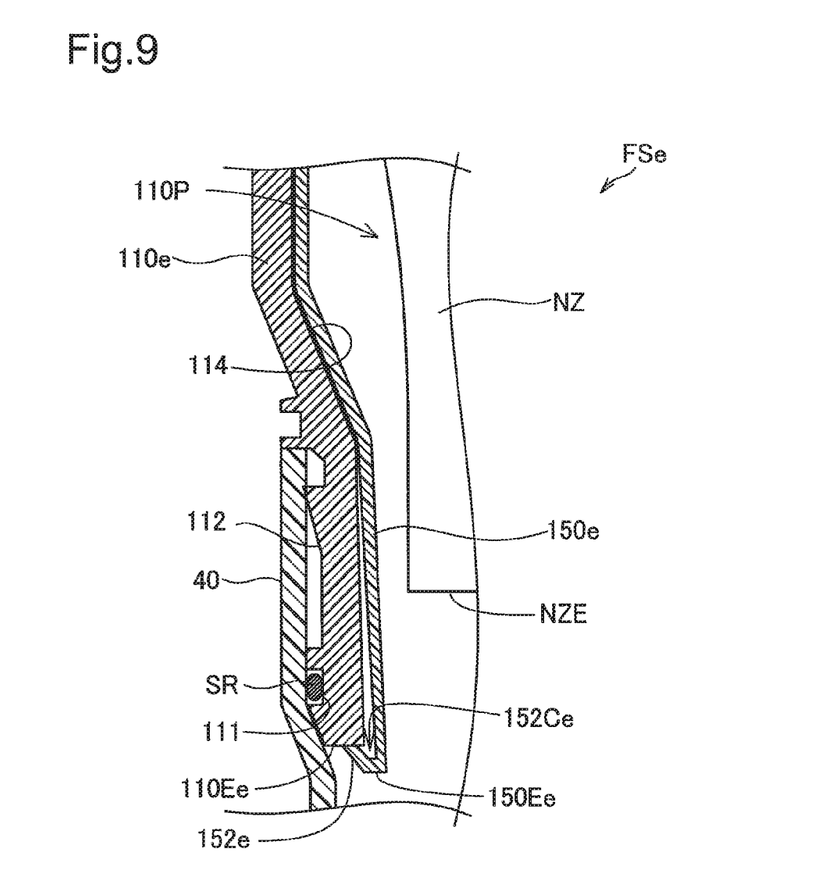
FIG. 9 is an enlarged view corresponding to the area X1 of FIG. 2 of the first embodiment when a nozzle guide is fixed inside of a filler neck body according to a fifth embodiment.

FIG. 9 is an enlarged view corresponding to the area X1 of FIG. 2 of the first embodiment when a nozzle guide 150e is fixed inside of a filler neck body 110e according to a fifth embodiment. A fuel supply device FSe of the fifth embodiment differs from the fuel supply device FS of the first embodiment by the shape of a downstream-side end 110Ee of the filler neck body 110e and the shape of a downstream-side end 150Ee of the nozzle guide 150e. Otherwise the configuration of the fuel supply device FSe of the fifth embodiment is similar to the configuration of the fuel supply device FS of the first embodiment. More specifically the fuel supply device FSe of the fifth embodiment employs a different configuration for a downstream-side engagement part of the filler neck body 110e and the nozzle guide 150e. The following describes only the different parts of the fifth embodiment from the fuel supply device FS of the first embodiment, and the description on the similar parts to those of the fuel supply device FS is omitted.

As illustrated in FIG. 9, the nozzle guide 150e of the fuel supply device FSe includes a first pawl 152e provided on the downstream-side end 150Ee and configured to engage with the filler neck body 110e. The first pawl 152e is configured to engage with an end face of the downstream-side end 110Ee that is perpendicular to the axis OL1 of the nozzle guide 150e. Accordingly the fuel supply device FSe excludes the first groove provided to engage with the first pawl 152e. According to a modification of the fifth embodiment, the first pawl 152e may not be necessarily formed on the downstream-side end 150Ee of the nozzle guide 150e, but the downstream-side end 150Ee may be extended toward the downstream side of the first pawl 152e. Like the fuel supply device FS of the first embodiment, the configuration of the fuel supply device FSe of the fifth embodiment reduces the possibility that the nozzle guide 150e comes off from the filler neck body 110e and the possibility that the engagement part of the filler neck body 110e and the nozzle guide 150e is damaged by the force produced in the process of insertion of the fueling gun NZ.

F. Modifications

The disclosure is not limited to the above embodiments but may be implemented by any of various other aspects without departing from the scope of the disclosure. Some of possible modifications are given below.

As illustrated in FIGS. 3 to 9, the position of the fueling gun end NZE (NZEb, NZE, NZEd) of the fueling gun NZ (NZb, NZc, NZd) inserted in the fuel supply device FS (FSa, FSb, FSc, FSd, FSe) differs in the first to the fifth embodiments described above. This does not indicate, for example, that the fueling gun NZd of the fourth embodiment has the shorter length than that of the fueling gun NZ of the first embodiment but indicates that the length of the fueling gun NZ and the position of the fueling gun end NZE after insertion of the fueling gun NZ in the fuel supply device FS are varied in any of various ways. In any of the configurations, the engagement part of fixing the nozzle guide 150 (150a, 150b, 150c, 150d, 150e) to the filler neck body 110 (110a, 110b, 110c, 110d, 110e) is located on the fuel tank side in the filler neck body 110.

The above first to fifth embodiments describe the examples of the configuration of the engagement part to fix the nozzle guide 150 (150a, 150b, 150c, 150d, 150e) to the filler neck body 110 (110a, 110b, 110c, 110d, 110e), the example of the configuration of the annular projection 112 formed on the outer circumferential face of the filler neck body 110 and the examples of the configurations of the first stepped portion 119 (119b) and the second stepped portion 159. These configurations are, however, not essential but may be modified in any of various ways. For example, in the first embodiment, the first groove 115 and the first pawl 152 are formed at the same positions along the axis OL1. According to a modification, either one of the first groove 115 and the first pawl 152 may be formed on the downstream side of the other. According to another modification, the first groove 115 and the first pawl 152 may be formed along the entire circumferences of the filler neck body 110 and the nozzle guide 150 about the axis OL1. According to another modification, the filler neck body 110 may exclude the annular projection 112 used to press-fit the filler tube 40 thereon but may be fixed to the filler tube 40 by means of a hose band. In the above embodiments, the first stepped portion 119 and the first groove 115 are formed as stepped portions extended outward in the circumferential direction about the axis OL1 as the center. According to a modification, the first stepped portion 119 or the first groove 115 may be configured by a plurality of steps or may be inclined toward the upstream side or toward the downstream side. According to another modification, the first stepped portion 119 or the first groove 115 may be provided along the entire circumference of the filler neck body 110 about the axis OL1 as the center or may be provided along part of the circumference. The filler neck body 110 may not have the single-layered structure but may have a double-layered structure including a polyamide inner layer and a polyethylene outer layer or may have a multi-layered structure. The filler neck body 110 may be made of a metal.

The disclosure is not limited to any of the embodiments, the examples, and the modifications described above but may be implemented by a diversity of other configurations without departing from the scope of the disclosure. For example, the technical features of any of the embodiments, the examples and the modifications corresponding to the technical features of each of the aspects described in SUMMARY may be replaced or combined appropriately in order to solve part or all of the problems described above or in order to achieve part or all of the advantageous effects described above. Any of the technical features may be omitted appropriately unless the technical feature is described as essential herein.

What is claimed is:

1. A fuel supply device configured to supply a liquid fuel to a fuel tank, comprising:
a filler neck body made of a resin and provided in a tubular shape to include an opening which a fueling gun used to supply the liquid fuel is inserted in and a connection port formed on a fuel tank-side end of the filler neck body and configured to form a fuel passage that introduces the supplied liquid fuel from the opening to the connection port; and
a neck integrated component located on an inner side in a radial direction of the filler neck body, the neck integrated component being configured to form an insertion passage which the fueling gun is inserted in, wherein
the neck integrated component is arranged to engage with inside of the filler neck body on a fuel tank side or with a fuel tank-side end of the filler neck body,
a fuel tank-side end of the neck integrated component is located on the fuel tank side of a fueling gun end that is a fuel tank-side end of the inserted fueling gun,
the neck integrated component is engaged with the inside of the filler neck body or with the fuel tank-side end of the filler neck body on the fuel tank side of the fueling gun end
the filler neck body includes a first groove provided on the fuel tank side of the fueling gun end and configured to increase a diameter of the fuel passage,
the neck integrated component includes a first pawl configured to change an amount of protrusion in the radial direction, and
the first pawl is engaged with the first groove, such that the neck integrated component is engaged with the inside of the filler neck body or with the fuel tank-side end of the filler neck body.

2. The fuel supply device according to claim 1,
wherein the filler neck body includes an annular projection provided on an outer circumference on the fuel tank side and configured to engage with inside of a tube that is arranged to connect the fuel supply device with the fuel tank.

3. The fuel supply device according to claim 2,
wherein the filler neck body includes a first stepped portion provided on an opening side of the fueling gun end and configured to reduce the diameter of the fuel passage, and
the neck integrated component includes a second stepped portion formed along the first stepped portion.

4. The fuel supply device according to claim 3,
wherein the filler neck body includes a second pawl configured to change an amount of protrusion in the radial direction, and
the neck integrated component includes a projection protruded outward in the radial direction, wherein
the second pawl is engaged with a second groove that is formed by the projection and an outer circumferential face of the neck integrated component, such that the neck integrated component is engaged with the inside of the filler neck body or with the fuel tank-side end of the filler neck body.

5. The fuel supply device according to claim 2,
wherein the filler neck body includes a second pawl configured to change an amount of protrusion in the radial direction, and
the neck integrated component includes a projection protruded outward in the radial direction, wherein
the second pawl is engaged with a second groove that is formed by the projection and an outer circumferential face of the neck integrated component, such that the neck integrated component is engaged with the inside of the filler neck body or with the fuel tank-side end of the filler neck body.

6. The fuel supply device according to claim 1,
wherein the filler neck body includes a first stepped portion provided on an opening side of the fueling gun end and configured to reduce the diameter of the fuel passage, and
the neck integrated component includes a second stepped portion formed along the first stepped portion.

7. The fuel supply device according to claim 1,
wherein the filler neck body includes a first stepped portion provided on an opening side of the fueling gun end and configured to reduce the diameter of the fuel passage, and
the neck integrated component includes a second stepped portion formed along the first stepped portion.

8. The fuel supply device according to claim 1,
wherein the filler neck body includes a second pawl configured to change an amount of protrusion in the radial direction, and
the neck integrated component includes a projection protruded outward in the radial direction, wherein
the second pawl is engaged with a second groove that is formed by the projection and an outer circumferential face of the neck integrated component, such that the neck integrated component is engaged with the inside of the filler neck body or with the fuel tank-side end of the filler neck body.

9. The fuel supply device according to claim 1,
wherein the filler neck body includes a second pawl configured to change an amount of protrusion in the radial direction, and
the neck integrated component includes a projection protruded outward in the radial direction, wherein
the second pawl is engaged with a second groove that is formed by the projection and an outer circumferential face of the neck integrated component, such that the neck integrated component is engaged with the inside of the filler neck body or with the fuel tank-side end of the filler neck body.

10. The fuel supply device according to claim 1,
wherein the filler neck body includes a second pawl configured to change an amount of protrusion in the radial direction, and
the neck integrated component includes a projection protruded outward in the radial direction, wherein
the second pawl is engaged with a second groove that is formed by the projection and an outer circumferential face of the neck integrated component, such that the neck integrated component is engaged with the inside of the filler neck body or with the fuel tank-side end of the filler neck body.

11. The fuel supply device according to claim 1,
wherein the neck integrated component includes a first neck component configured to engage with the inside of the filler neck body, and a second neck component arranged on the fuel tank side of the first neck component and configured such that a position of the second neck component along a flow direction of the liquid fuel is restricted by a fuel tank-side end of the first neck component, wherein
a fuel tank-side end of the second neck component is located on the fuel tank side of the fueling gun end.

12. A fuel supply device configured to supply a liquid fuel to a fuel tank, comprising:
a filler neck body made of a resin and provided in a tubular shape to include an opening which a fueling gun used to supply the liquid fuel is inserted in and a connection port formed on a fuel tank-side end of the filler neck body and configured to form a fuel passage that introduces the supplied liquid fuel from the opening to the connection port; and
a neck integrated component located on an inner side in a radial direction of the filler neck body, the neck integrated component being configured to form an insertion passage which the fueling gun is inserted in, wherein
the neck integrated component has an engaging portion to engage with inside of the filler neck body on a fuel tank side or with a fuel tank-side end of the filler neck body,
the engaging portion is allowed to be expanded and contracted in a radial direction of the insertion passage,
a fuel tank-side end of the neck integrated component is located on the fuel tank side of a fueling gun end that is a fuel tank-side end of the inserted fueling gun,
the neck integrated component is engaged with the inside of the filler neck body or with the fuel tank-side end of the filler neck body on the fuel tank side of the fueling gun end,
the filler neck body includes a first groove provided on the fuel tank side of the fueling gun end and configured to increase a diameter of the fuel passage,
the neck integrated component includes a first pawl configured to change an amount of protrusion in the radial direction, and
the first pawl is engaged with the first groove, such that the neck integrated component is engaged with the inside of the filler neck body or with the fuel tank-side end of the filler neck body.

13. The fuel supply device according to claim 12,
wherein the filler neck body includes an annular projection provided on an outer circumference on the fuel tank side and configured to engage with inside of a tube that is arranged to connect the fuel supply device with the fuel tank.

14. A fuel supply device configured to supply a liquid fuel to a fuel tank, comprising:
a filler neck body made of a resin and provided in a tubular shape to include an opening which a fueling gun used to supply the liquid fuel is inserted in and a connection port formed on a fuel tank-side end of the filler neck body and configured to form a fuel passage that introduces the supplied liquid fuel from the opening to the connection port along an axis of the filler neck body; and a neck integrated component located on an inner side in a radial direction of the filler neck body, the neck integrated component being configured to form an insertion passage in which the fueling gun is inserted, wherein a fuel tank-side end of the neck integrated component is located on the fuel tank side of a fueling gun end that is a fuel tank-side end of the inserted fueling gun, the neck integrated component has an engaging portion configured to engage with the inner side of the filler neck body on a fuel tank side or with the fuel tank-side end of the filler neck body on the fuel tank side of the fueling gun end, and the engaging portion is configured to expand and contract in a radial direction at a position along the axis of the filler neck body, the filler neck body includes a first groove provided on the fuel tank side of the fueling gun end and configured to increase a diameter of the fuel passage, the neck integrated component includes a first pawl configured to change an amount of protrusion in the radial direction, and the first pawl is engaged with the first groove, such that the neck integrated component is engaged with the inside of the filler neck body or with the fuel tank-side end of the filler neck body.

15. The fuel supply device according to claim 14, wherein the filler neck body includes an annular projection provided on an outer circumference on the fuel tank side and configured to engage with inside of a tube that is arranged to connect the fuel supply device with the fuel tank.

\* \* \* \* \*